Jan. 5, 1932.   H. R. SCHUTZ   1,839,882
CUTTING DEVICE
Filed Sept. 12, 1927   3 Sheets-Sheet 1
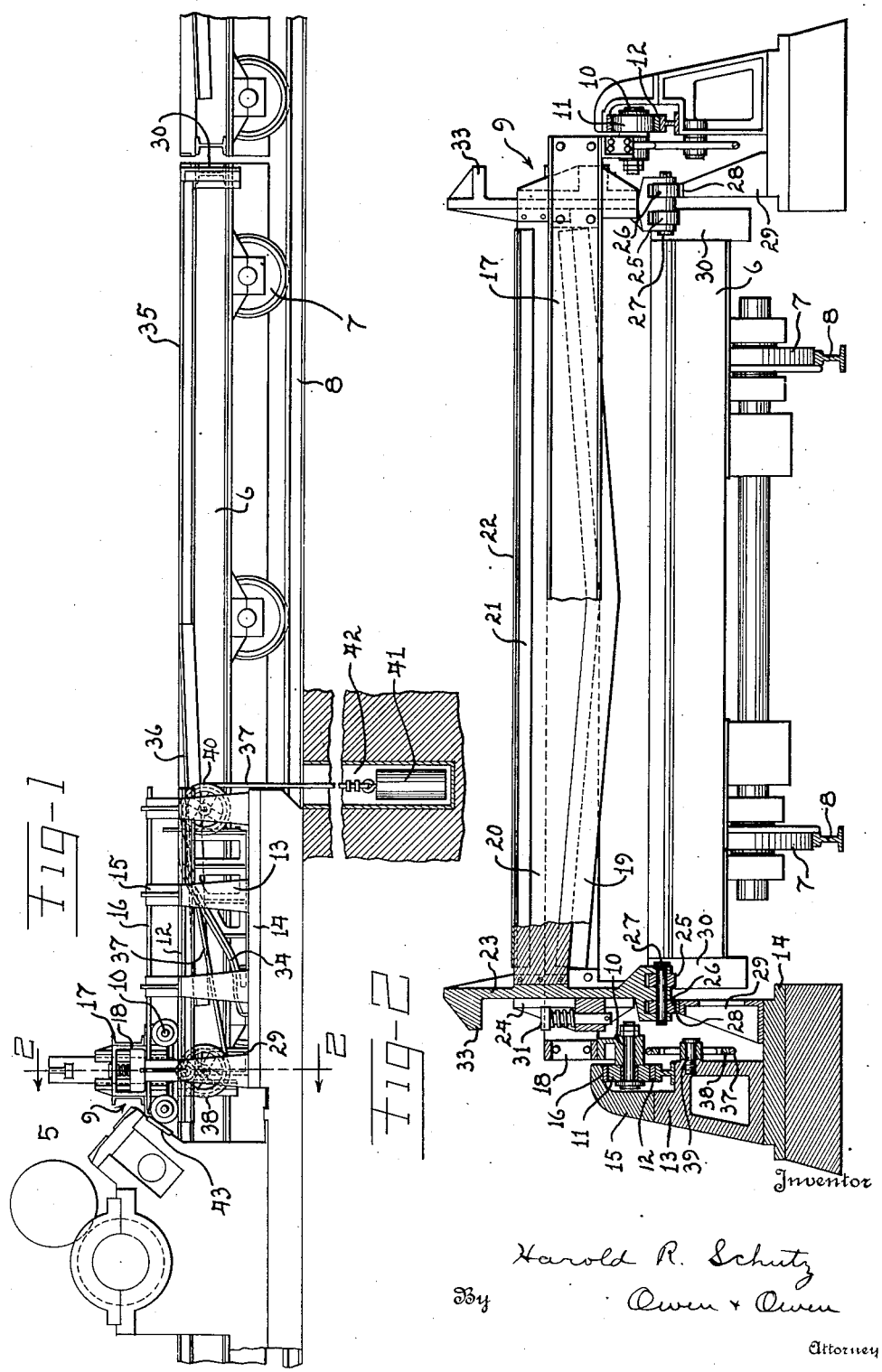
Inventor
Harold R. Schutz
By Owen & Owen
Attorney

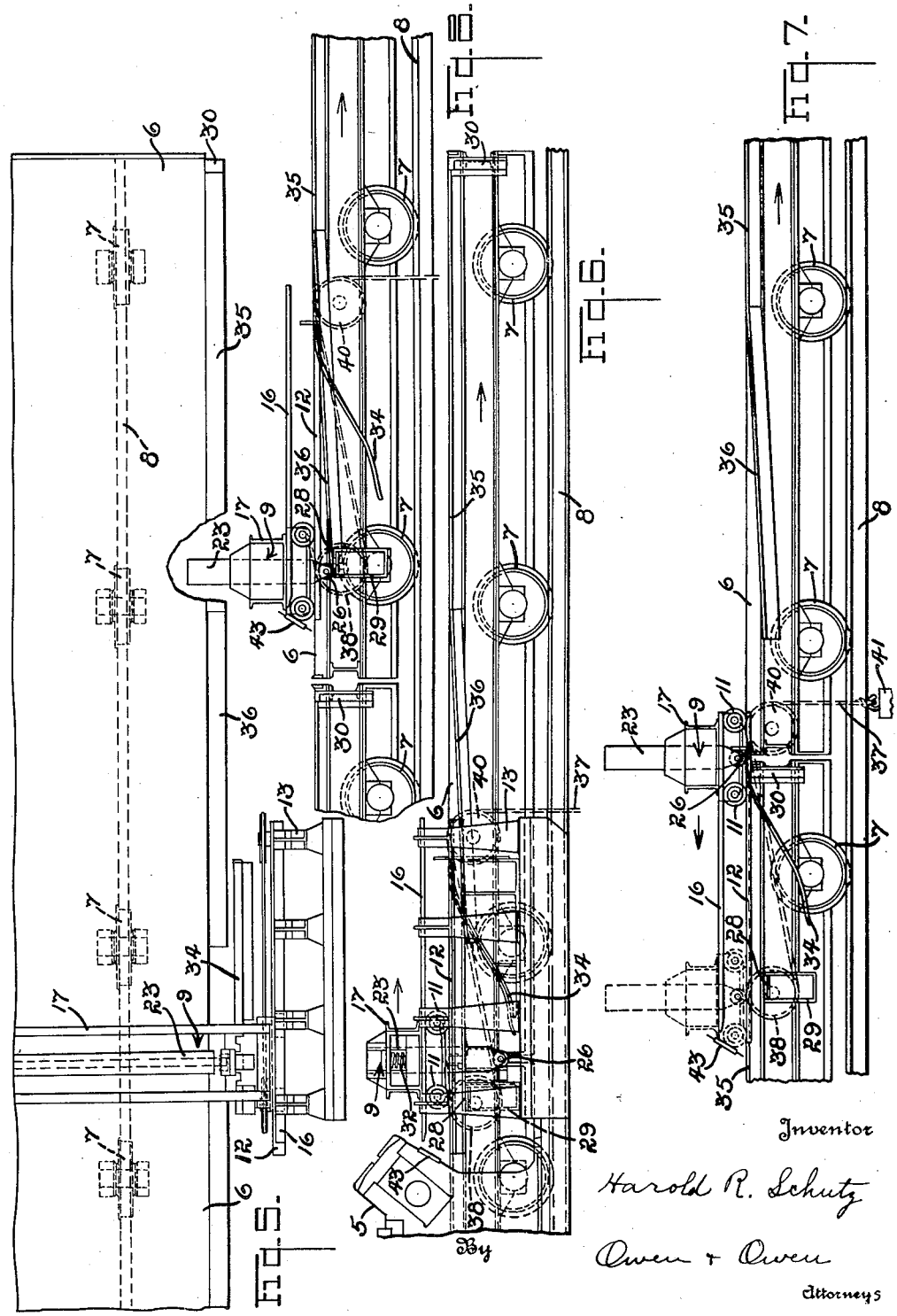

Patented Jan. 5, 1932

1,839,882

UNITED STATES PATENT OFFICE

HAROLD R. SCHUTZ, OF TOLEDO, OHIO, ASSIGNOR, BY MESNE ASSIGNMENTS, TO LIBBEY-OWENS-FORD GLASS COMPANY, OF TOLEDO, OHIO, A CORPORATION OF OHIO

CUTTING DEVICE

Application filed September 12, 1927. Serial No. 219,003.

This invention relates to a device adapted for use in cutting sheet material, as for example, in cutting rolled glass just after it leaves the rolls and while it rests on the tables used for carrying the glass to the leer.

The general object of the invention is to provide a suitable cutting device with mechanism for operating the same in co-ordination with a series of traveling tables, which are adapted to receive the plastic glass in a continuous ribbon, as it is delivered from the rolls, so that the glass is cut into plates of suitable size, without any delay, preparatory to its introduction into the leer.

More specifically stated, the invention comprises a cutting element mounted on a carriage which is moved along with one of the tables, while the cutting element is moved across the glass to sever the same, after which the carriage and cutting element, as the tables continue their travel, are restored to their original positions, in readiness for the next severing operation.

The invention consists further in various novel combinations of elements, the objects and advantages of which will be more particularly described in connection with the accompanying drawings illustrating the preferred embodiment of the same.

In the drawings:

Figure 1 is a side elevation of the invention operatively associated with the delivery end of a glass rolling machine.

Fig. 2 is a cross sectional view taken substantially on the line 2—2 of Fig. 1, showing the cutter in its initial position.

Fig. 5 is a partial plan view of the invention after the cutter has started to move forwardly with the tables and after the cutting stroke has been completed.

Fig. 6 is a side elevation with the parts in the same position as in Fig. 5.

Fig. 7 is a side elevation showing the position of the parts as the cutter has completed its forward movement with the tables, the cutter having been raised to release it and permit it to return toward initial position.

Fig. 8 is a side elevation showing the cutter after it has returned to initial position and before the tables have advanced far enough to start the next forward movement of the cutter.

Figure 3:
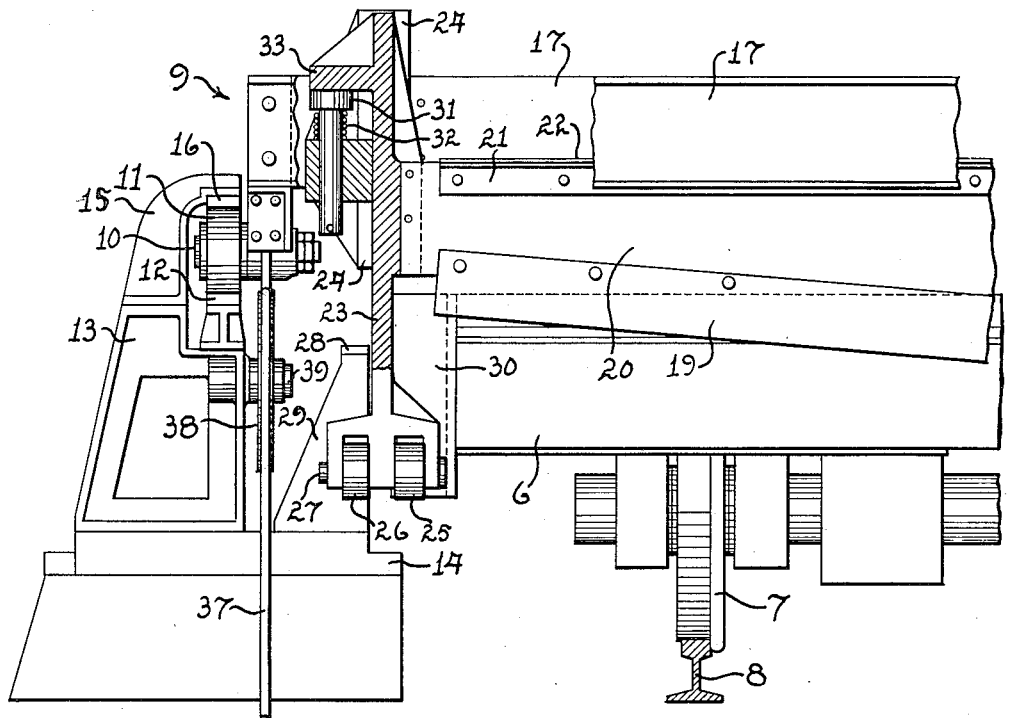
Fig. 3 is a partial cross section similar to Fig. 2, but on a larger scale, and showing the cutter after the glass has been severed.
Figure 4:
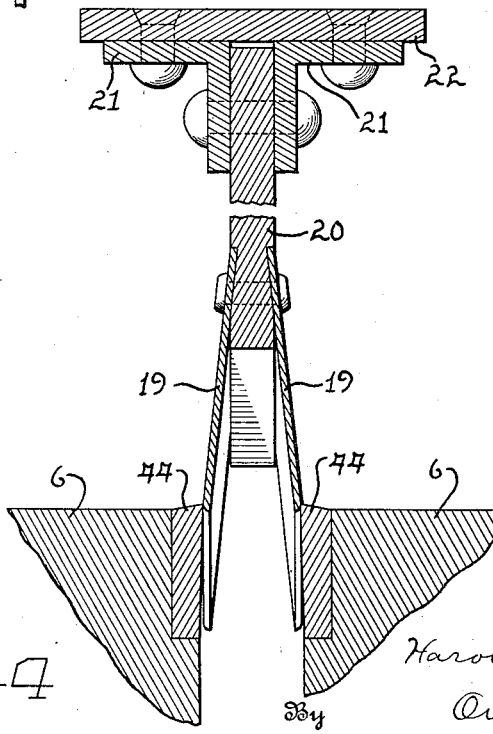
Fig. 4 is an enlarged detail sectional view taken transversely of the cutting element.

As herein shown, the invention is associated with the delivery end of a rolling machine 5. Associated with the rolling machine are a series of tables 6 which have a slow continuous travel in timed relation to the operation of the rolling machine so as to receive the glass as it is delivered in a continuous ribbon from the rolls. These tables are supported on wheels 7 which are guided on tracks 8.

The cutting device comprises a carriage 9 having laterally disposed stub shafts or axles 10 on which are mounted rollers 11. These rollers are guided on tracks 12 which are supported on stands 13 mounted on bases 14 at the sides of the table runway. Thus, the carriage is supported above the path of the tables and is guided for movement in the same direction as the tables. Secured to the stands 13 are overhanging extensions 15 carrying guide bars 16 which are located over the rollers 11 with a slight clearance so that the knife cannot tip out of its proper position during the cutting of the glass.

The carriage has two channel bars 17 which are disposed transversely above the table in spaced relation to each other and connected at their ends by frame pieces 18. The cutter comprises blades 19 secured to opposite faces of a girder 20 which is reinforced by angle bars 21 secured to its upper portion and connected by a transverse header 22. The girder 20 is secured at its ends to vertical slides 23 which are adapted to move upwardly or downwardly in guideways 24 secured to the carriage 9.

Each slide 23 carries at its lower end two rollers 25 and 26 which are mounted on a transverse pin 27. It is through the medium of these rollers that the position of the cutting element is determined. In its initial position, each roller 26 rests on a short track 28 secured to the upper end of a stand 29 mounted on the base 14. Each table 6 carries an abutment 30 which is adapted to engage the roller 25 and to advance the cutting element together with the carriage 9 at the same rate of travel as the table. Soon after the knife begins to advance, the rollers 26 leave the ends of the tracks 28 and permit the knife to drop to the position shown in Fig. 3. As the cutting element drops, it is cushioned by bumpers 31 which are yieldably held in the ends of the carriage by springs 32 and are engaged by lugs 33 on the upper ends of the slides 23.

After the cutting element has dropped, the rollers 26 are free and the rollers 25 are engaged only by the abutments 30. As the carriage continues its advance, however, each of the rollers 26 engages a cam track 34 which is inclined upwardly and forwardly until it reaches a higher level than that of the track 28. When this point is reached, the roller 25 rides over the upper end of the abutment 30 and permits the carriage to return to its initial position. In the return of the carriage, the roller 25, as it passes over the abutment or pusher 30, rides quickly along a horizontal track 35 secured to the edge of the table, until the carriage is stopped with the roller 26 above the track 28. Then as the table continues to advance, the roller 25 rides along an inclined track 36, which is a continuation of the track 35, thus permitting the carriage to descend gradually until the roller 26 again rests on the track 28. The carriage then remains at rest until, as the tables continue their travel, the abutment 30 of the next table engages the roller 25.

In order to provide the force necessary for returning the carriage to its initial position, a cable 37 is attached to each side of the carriage and passes rearwardly about a sheave 38 mounted on a stud 39 secured to the rear stand 13. The table extends thence forwardly over a sheave 40 similarly mounted on the front stand 13. The front end of the cable carries a weight 41 which is suspended in a well 42. As the carriage advances with the table, therefore, the cable is drawn forwardly with the carriage, raising the weight 41. It is to be understood that there is a weight 41 at each side of the carriage and these weights are sufficient to return the carriage to its initial position as soon as it is released. A suitable buffer 43 of rubber or the like is attached to the end stand of the rolling machine and acts as a stop for the carriage at the completion of its return movement.

It is to be noted that the cutting element comprises two downwardly diverging blades 19, which as the cutting element descends, are brought into shearing relation to blades 44 secured to the adjacent ends of the tables. The edge of each blade 19 is lowest at the center and inclines upwardly toward each end so that the cutting action will not be simultaneous across the full width of the table but will start at the center and progress rapidly toward each side. By the mechanism above described, the travel of the carriage is accurately gaged in co-ordination with the travel of the tables so that the cutting element, as it descends, registers accurately with the cooperating ledger blades 44.

The sudden downward movement of the cutting element insures a quick, clean shearing action and the knife is then gradually raised clear of the table. The forward movement of the table advances the carriage and also by raising the weights 41 serves to store up the necessary energy for returning the carriage to its initial position.

While I have shown and described the present construction in considerable detail. it is to be understood that this is only for the purpose of illustration and that various modifications may be made therein without any material departure from the scope of the invention as claimed.

What I claim is:

1. In a device of the character described, a traveling table for supporting the material to be cut, a carriage, means at opposite sides of the table for supporting said carriage for travel above the table, means for moving the carriage forwardly in predetermined relation to the table, a horizontal cutting element guided for vertical bodily movement with respect to the carriage, stationary means at opposite sides of the table outwardly thereof for initially supporting the cutting element, and means for moving said cutting element forwardly with the carriage to cause said cutting element to leave said initial supporting means and move downwardly and then upwardly across the plane of the material during the forward travel of the carriage with the table.

2. In a device of the character described, the combination with a traveling table for supporting the material to be cut, of a carriage, means at opposite sides of the table for supporting said carriage for travel above the table, means for moving the carriage forwardly with the table and in predetermined relation thereto for a certain distance. a horizontal cutting element guided for vertical bodily movement with respect to the carriage, stationary means at opposite sides of the table outwardly thereof for initially supporting the cutting element, means for moving the cutting element forwardly with the carriage to cause said cutting element, during its forward travel, to leave the initial supporting means and move downwardly and then upwardly across the plane of the material, and means for returning the carriage to its initial position after its upward movement, while the table continues its forward travel.

3. In a device of the character described, the combination with a longitudinally traveling table for supporting the material to be cut, of a carriage, means at opposite sides of the table for supporting said carriage for travel above the table, a horizontal cutting element guided for up and down bodily movement with respect to the carriage, means for moving the carriage forwardly in such relation to the table that the edge of the table is in the path of movement of the cutting element, stationary means at opposite sides of the table outwardly thereof for initially supporting the cutting element, and means for moving said cutting element forwardly with the carriage to cause the cutting element to leave the initial supporting means and move downwardly into shearing relation to the edge of the table, and then upwardly away from the same during the forward travel of the carriage with the table.

4. In a device of the character described, the combination with a longitudinally traveling table for supporting the material to be cut, of a carriage, means at opposite sides of the table for supporting said carriage for travel above the table, a horizontal cutting element guided for up and down bodily movement with respect to the carriage, means for moving the carriage forwardly for a certain distance in such relation to the table that the edge of the table is in the path of movement of the cutting element, stationary means at opposite sides of the table outwardly thereof for initially supporting the cutting element, means for moving said cutting element forwardly with the carriage to cause the cutting element to leave said initial supporting means and move with a shearing relation to the edge of the table and then away from the same during the forward travel of the carriage with the table, and means for moving the carriage rearwardly to its initial position after the completion of the upward movement of the cutting element, while the table continues its forward travel.

5. In a device of the character described, the combination with a series of tables arranged in spaced end to end relation, of a carriage, means at opposite sides of the table for supporting said carriage for travel above the tables, means for moving the carriage forwardly in predetermined relation to the tables, a horizontal cutting element guided for bodily movement up and down with respect to said carriage, stationary means at opposite sides of the table outwardly thereof for initially supporting the cutting element, and means for moving the cutting element forwardly with the carriage to cause said cutting element to leave said initial supporting means and move into shearing relation to the adjacent ends of two tables and then away from the same while said carriage is traveling forwardly with said tables.

6. The combination with a series of tables mounted for longitudinal travel and arranged in spaced end to end relation, of a carriage, means at opposite sides of the table for supporting said carriage for travel above the tables, means for moving the carriage forwardly for a certain distance in predetermined relation to the tables, a horizontal cutting element guided for bodily movement up and down with respect to said carriage, stationary means at opposite sides of the table outwardly thereof for initially supporting the cutting element, means for moving the cutting element forwardly with the carriage to cause said cutting element to leave said initial supporting means and move into shearing relation to the adjacent ends of two tables and then away from the same while said carriage is traveling forwardly with said tables, and means for then moving the carriage rearwardly to its initial position, preparatory to a similar operation on the next two table ends.

7. The combination with a traveling table for supporting material to be cut, of a carriage, means at opposite sides of the table for supporting said carriage above the table, a frame mounted on said carriage, an abutment secured to the table and engageable with a portion of the frame to advance said frame and carriage with the table, a horizontal cutting element mounted on the frame, stationary means at opposite sides of the table outwardly thereof for initially supporting said cutting element, means for moving the cutting element forwardly with the carriage to cause a movement of the frame with respect to the carriage to cause said cutting element to cut the material carried by the table during the forward travel of said carriage, and means for releasing the frame from said abutment after the carriage has been advanced to a predetermined point.

8. The combination with a series of traveling tables in spaced end to end relation, of a carriage, means at opposite sides of the tables for supporting said carriage above the path of the tables, a frame mounted on said carriage, an abutment secured to each table and engageable with a portion of the frame to advance said frame and carriage with the table, a horizontal cutting element mounted on the frame, stationary means at opposite sides of the tables outwardly thereof for initially supporting said cutting element, means for moving the cutting element forwardly with the carriage to cause a movement of the frame with respect to the carriage to cause said cutting element to cut the material carried by the table during the forward travel of said carriage, means for releasing the frame from said abutment after the carriage has been advanced to a predetermined point, and means for automatically returning said carriage, as soon as it is released, to its initial position ready to be advanced by the abutment on the next table.

9. The combination with a traveling table for supporting material to be cut, of a carriage guided for longitudinal movement, means at opposite sides of the table for supporting said carriage, a frame movable up and down with respect to the carriage, a horizontal cutting element carried by the frame, means for moving the carriage and frame forwardly with the table, stationary means at opposite sides of the table outwardly thereof for supporting said cutting element during the first part of its forward movement and then permitting it to drop, means for gradually raising the cutting element as it continues to travel forwardly with the table, and means for automatically returning the cutting element and the carriage to their initial position after the cutter has been raised to a predetermined height.

10. The combination with a traveling table for supporting material to be cut, of a carriage guided for longitudinal movement, a frame movable up and down with respect to the carriage, a cutting element carried by the frame, means for moving the carriage and frame forwardly with the table, rollers carried by said frame, a short track engageable by each roller for supporting said cutting element above the table in its initial position, permitting the cutter to drop as the roller reaches the end of the track, cam tracks engageable by said rollers to raise the cutting element as it continues to travel with the table, and means carried by the table and cooperating with said rollers to return the carriage and cutting element automatically to their initial position.

11. The combination with a traveling table for supporting material to be cut, of a carriage, means at opposite sides of the table for supporting said carriage for travel above the table, means for moving the carriage forwardly in predetermined relation to the table for a certain distance, a horizontal cutting element guided for up and down movement with respect to the carriage, stationary means at opposite sides of the table outwardly thereof for initially supporting said cutting element, means for moving the cutting element forwardly with the carriage to cause said cutting element, during its forward travel, to leave the initial supporting means and move downwardly and then upwardly across the plane of the material, and motive means in which energy is stored up by the forward movement of the carriage for returning said carriage to its initial position as soon as it is released from the table.

12. The combination with a series of traveling tables arranged in spaced end to end relation for supporting material to be cut, of a carriage, means at opposite sides of the table for supporting said carriage above the path of the tables, a frame mounted for vertical reciprocation on the carriage, an abutment secured to each table and engageable with a portion of the frame to advance said frame and carriage with the table, a horizontal cutting element secured to the frame, stationary means at opposite sides of the tables outwardly thereof for initially supporting the cutting element, means for moving the cutting element forwardly with the carriage to cause said cutting element to leave the initial supporting means and under the influence of gravity to cut the material during the forward travel of said carriage, means for releasing the frame from said abutment after the carriage has been advanced to a predetermined point and motive means which is set by the forward movement of the carriage for returning said carriage to its initial position as soon as it is released from the abutment, preparatory for engagement by the abutment on the next table.

13. The combination with a carriage mounted for substantially horizontal movement to and fro, of a horizontal frame slidable bodily up and down with respect to said carriage, a cutter secured to the frame, means positioned at opposite sides of the table outwardly thereof for holding said frame raised in its initial position but allowing it to drop after its forward movement is begun, means for gradually raising said frame as the carriage continues to move forwardly and means for then returning the carriage to its initial position.

14. The combination with a carriage mounted for substantially horizontal movement to and fro, a horizontal frame slidable bodily up and down with respect to said carriage, a cutter secured to the frame, means positioned at opposite sides of the table outwardly thereof for holding said frame raised in its initial position but allowing it to drop after its forward movement is begun, means for gradually raising said frame as the carriage continues to move forwardly, motive means in which energy is stored by the forward movement of the carriage and means for releasing said motive means as the carriage completes its forward movement whereby to return the carriage to its initial position.

15. The combination with a carriage mounted for substantially horizontal movement to and fro, a horizontal frame slidable bodily up and down with respect to said carriage, a cutter secured to the frame, means positioned at opposite sides of the table outwardly thereof for holding said frame raised in its initial position but allowing it to drop after its forward movement is begun, means for gradually raising said frame higher than it was in its initial position while the carriage continues to move forwardly, said last mentioned means being released by the upward movement of said frame after it passes the level of its initial position and means for then returning the carriage to its initial position.

16. The combination with a series of tables mounted for longitudinal travel and arranged in spaced end to end relation and adapted to receive a continuous ribbon of glass as it comes from the rolls, of a cutting element, a horizontal track initially supporting said cutting element, means for temporarily advancing the cutting element at the same speed as the tables, until it leaves the track and drops into shearing relation to two adjacent table ends simultaneously during the forward travel thereof, said last mentioned means also constituting a guide for the cutting element during all of its downward travel.

17. The combination of a series of traveling tables in spaced end to end relation, of a cutting element, a horizontal track on which said element initially rests independently of the table, means actuated by a table for causing said cutting element to leave the end of the track and to drop bodily into shearing relation to the adjacent ends of two tables during their forward travel, and means for subsequently raising said cutting element and returning it to its initial position, preparatory to bringing it into shearing relation to the next two table ends.

18. The combination with a series of tables mounted for longitudinal travel, a horizontal cutting device, stationary means positioned at opposite sides of the tables outwardly thereof for initially supporting the cutting device above the path of the tables, an abutment on each table engageable with the cutting device to move it from its initial support and permit it to drop bodily as the table moves forwardly, means for lifting the cutting device above said abutment during its forward travel with the table, means for subsequently moving the cutting device rearwardly, and means for supporting the cutting device in its upper position during its rearward travel and then lowering it to its initial support.

19. The combination with a series of tables mounted for longitudinal travel, a carriage mounted for movement in the same direction in which the table moves, a cutting member mounted on the carriage and reciprocable up and down with relation thereto, a horizontal track initially supporting the cutting member, an abutment on each table engageable with the cutting member to move the same forwardly with the carriage to cause the cutting member to leave said track and drop by gravity, means for subsequently lifting the cutting element above said abutment during its forward travel with the table, means for then moving the cutting element and carriage rearwardly, and means for supporting the cutting element in its uppermost position during its rearward travel and then lowering it to the initial supporting track.

In testimony whereof I have hereunto signed my name to this specification.

HAROLD R. SCHUTZ.